Figure 1:
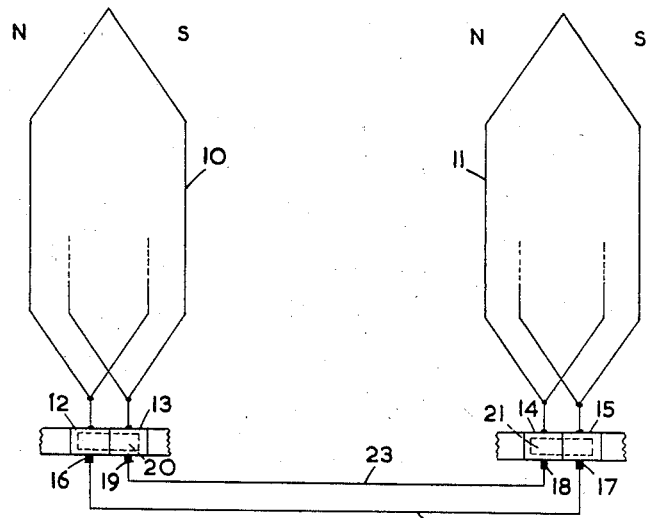

Nov. 18, 1952   H. VICKERS   2,618,768
POLYPHASE ALTERNATING CURRENT COMMUTATOR MOTORS
Filed April 14, 1948

Herbert Vickers
Inventor

By
John James Victor Armstrong
Attorney

Patented Nov. 18, 1952

2,618,768

UNITED STATES PATENT OFFICE 2,618,768

POLYPHASE ALTERNATING CURRENT COMMUTATOR MOTORS

Herbert Vickers, Windsor, England

Application April 14, 1948, Serial No. 21,012
In Great Britain April 16, 1947

13 Claims. (Cl. 318—244)

1

This invention concerns polyphase alternating current commutator motors, and is especially concerned with three-phase series and three-phase shunt and three-phase compound A. C. commutator motors.

In all such machines, in addition to the ordinary leakage reactance electromotive force in a coil undergoing commutation, an additional E. M. F. due to the rotating field in the machine, is set up in that coil. This E. M. F. is of slip frequency, and is a maximum at standstill.

To secure good commutation in such machines, it has been necessary heretofore to provide a large number of poles, with corresponding low flux per pole and single turn coils are usual in the rotor. Further expedients have been resorted to, such as the provision of high resistance connections between the coils and commutator segments to reduce the circulating currents. Furthermore, the rotor has been supplied at low voltage, but this has resulted in relatively large armature and commutator diameter with a large number of brushes. It is believed that design limitations which have obtained in polyphase commutator motors, due to the E. M. F. generated in each coil short-circuited by the brushes, has been the primary reason why such machines have not hitherto been widely adopted.

Both the three-phase series and shunt A. C. commutator motors have excellent characteristics for ships winches, capstans and other applications, for they have a seperate torque-speed characteristic for each setting of the brushes and large speed ranges can be secured, and any desired torque within a wide range can be obtained at any speed by suitable brush shift from the starting position. In the application to cargo winches, the brushes of the rotor remain fixed in position and the torque-speed characteristics required can be obtained with fixed brush position, by using a three-phase series induction regulator, but these good characteristics can only be obtained with satisfactory commutation by the various expedients referred to above.

The purpose of the present invention is to avoid the objectionable effect of the E. M. F. induced by the rotating field in each coil undergoing commutation and thus remove the principal factor which prevents the economical use of polyphase commutator motors by avoiding the limiting factors as heretofore recognised.

According to this invention a polyphase A. C. commutator motor includes means for deriving an E. M. F. of magnitude and phase comparable with that induced in each coil undergoing commutation and auxiliary commutator brush means for supplying each said E. M. F. to each said coil during commutation thereof in order to neutralise at least partially the effect of said induced E. M. F.

Each said E. M. F. is preferably applied by a pair of auxiliary brushes arranged to act on two commutator segments to which each coil short-circuited by a main brush is connected.

With fixed main brush positions the E. M. F. induced by the rotating field in each rotor coil short-circuited by a main brush is of slip frequency. Tappings from a coil on the stator winding which is similarly placed, with respect to the main brush, as the coil short-circuited by the main brush on the rotor, are connected by pairs of auxiliary brushes to the same segments as those short-circuited by each of the main brushes. As many coils on the stator will be tapped and so connected by brushes to the commutator segments as there are coils short-circuited by the brushes.

When the E. M. F.'s are thus derived from the stator it is obvious that the desired result is effected only at a standstill, for the frequency of the E. M. F.'s in the stator and rotor coils are only equal at standstill. At speeds of say 50% below and 50% above synchronous speed, the frequency of the E. M. F.'s in the short-circuited coils will be 50% of supply frequency, and the voltage generated in the coils short-circuited by the brushes will be only one half of that at standstill. Such E. M. F.'s can be taken care of by resistance lugs between the rotor coils and commutator segments, and at these speeds conditions are no better than if no tappings were taken from the stator coils. Under such conditions full voltage (as at standstill) obtains in the individual stator coils, and one half of full voltage in the rotor coils, and since the connections from stator coils to rotor coils, by means of the auxiliary brushes, are arranged for the voltages to be series aiding one another, it is clear that at these speeds the connections from the stator coils to rotor coils are not of benefit, and therefore means must be provided to break the circuits between said stator coils and said rotor coils when the speed has reached a low value. A centrifugal means for switching or for raising the auxiliary brushes may be used for this purpose. Resistance risers may be employed to give satisfactory commutation over the whole speed range.

This application of E. M. F.'s, from the stator coils to series aid the E. M. F.'s in the short-circuited coils in the rotor is perfect at standstill, and this is the principal method of achieving good commutation at standstill. However, it would be preferable to effect substantial neutralization at all speeds and to apply to each short-circuited rotor coil an E. M. F. which is of slip frequency and equal to the E. M. F. induced in the rotor coil by the rotating field in such a manner as to substantially reduce circulating current in the main brush.

One method, being a feature of the present invention of effecting this is attained by operating a frequency convertor at a speed equal to that of the motor, preferably by mounting such convertor on the shaft of the A. C. commutator motor. The armature will be wound for the same number of poles as the A. C. commutator motor. Provided the rotating field in the convertor rotates in the same direction as the rotating field in the A. C. commutator motor and provided the 3 phase A. C. supply is connected to the commutator side of the convertor, the frequency of the E. M. F.'s in the individual coils of the convertor will always be of slip frequency. Thus pairs of auxiliary brushes on the convertor commutator, touching adjacent commutator segments, can be connected, by means of auxiliary brushes on the commutator of the A. C. commutator motor, to the coils of the motor short-circuited by the main brushes and by adjusting the strength of the rotating field in the convertor, substantial elimination of circulating current in the main brush can be obtained at all speeds between zero and maximum.

The input to the convertor is preferably derived from the three voltages across the stator winding of the A. C. commutator motor. This arrangement ensures that the strength of the rotating field in the convertor and consequently the magnitude of the applied E. M. F.'s is of the correct value for efficient elimination of circulating current in the main brush throughout the speed range of the A. C. commutator motor.

Hence for substantial reduction of circulating current in the main brush at all speeds it is necessary to apply E. M. F.'s from the coils of the convertor into the short-circuited rotor coils of the A. C. commutator motor, which are equal and series aiding the E. M. F.'s induced by the rotating field in the said rotor coils. It will be understood that as many coils on the convertor will be connected by auxiliary brushes as there are coils short-circuited by the main brushes in the A. C. commutator motor.

Naturally these coils in the convertor from which E. M. F.'s are applied to the said rotor coils, must be so selected in position that equality and phase of the two sets of E. M. F.'s are obtained.

The frequency convertor may be of the usual form in which the stator is unwound, and merely provides a means of completing the magnetic circuit for the magnetic field. All that is necessary is to have auxiliary pairs of brushes on both frequency convertor commutator and main motor commutator, from which E. M. F.'s in the frequency changer coils can be applied into the main motor coils to reduce substantially the circulating current in the main brush.

A preferred method, being a still further feature of the present invention, of effecting substantial neutralisation at all speeds is attained by connecting each rotor coil when under commutation and thereby connected by a main brush to another rotor coil on the same armature and which is displaced 360° electrical apart and which would as a consequence under normal conditions of operation also beat a point of commutation.

Connections may be effected by a pair of auxiliary leads and two pairs of auxiliary brushes.

Each coil, short circuited at a main brush, is connected by such auxiliary leads and brushes to another coil a double pole pitch apart, and the connection is made in such a manner that the E. M. F.'s of the two coils, which are equal and in phase, assist one another around the two coils in series. Circulating current through the main brush is thus reduced and the circulating current around the two coils in series can be reduced by inserting high resistance lugs or connectors between the armature coils and commutator segments. In order to achieve by-passing of the circulating current from the main brush to the extent desired it is essential that the contact resistance of the auxiliary brushes be but a fraction of the contact resistance of the main brushes and that the leads to the auxiliary brushes have negligible resistance. If this condition is satisfied, then a large part of the current which would normally flow through the brush is by-passed through the coils in series. It is quite possible to satisfy the condition where the ratio of the contact resistance of a main brush to the sum of the contact resistances of two auxiliary brushes in series and the resistance of the lead connecting the auxiliary brushes, is fairly large.

Figure 2:
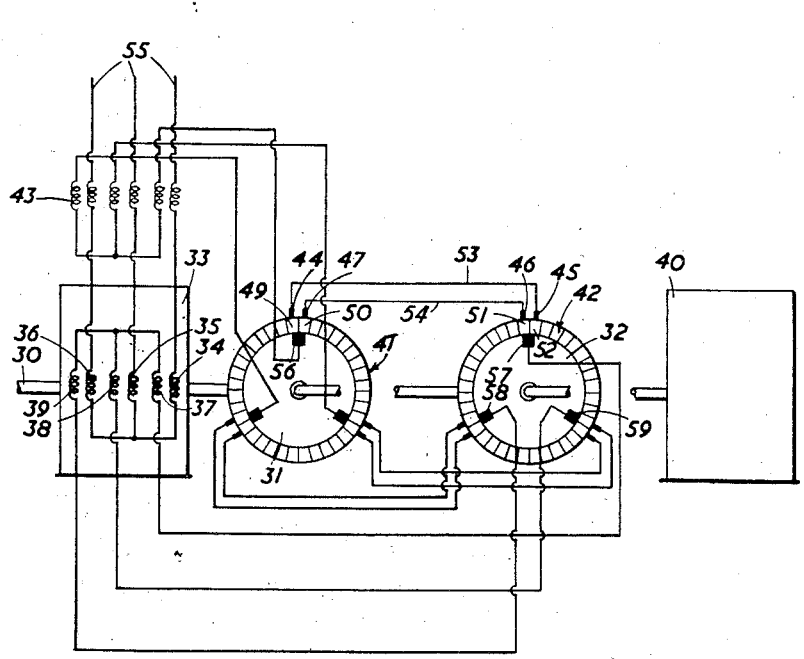

In the drawings:

Fig. 1 illustrates diagrammatically part of the connection of a three phase A. C. commutator motor embodying the present invention. Other parts of the motor have been omitted for the sake of clarity, and Fig. 2 illustrates diagrammatically part of the connection of a three phase A. C. commutator motor and frequency convertor.

One arrangement will be described further, by way of example with reference to Figure 1 of the accompanying drawing which illustrates diagrammatically part of a three phase A. C. commutator motor.

A motor has a rotor mounted on a shaft to rotate within a stator, the stator may be of the non-salient pole type wherein the stator is slotted so as to receive windings in the usual manner. A rotor winding may be carried in slots in the usual way and may be in the form of coils the ends of which are connected to the various commutator bars.

The coils 10, 11 are disposed on the rotor 360 electrical degrees apart and in the position shown in the drawing are undergoing commutation. The ends of the coil 10 are connected to commutator bars 12, 13 respectively, and those of coil 11 to bars 14, 15 respectively. The reference symbols N, S represent diagrammatically the state of the rotating magnetic field relative to the coils 10, 11 undergoing commutation at a particular instant of time and serve merely to indicate that at any instant the E. M. F. induced in each of the coils 10, 11, by the rotation of the magnetic field relative the coils will be substantially equal in phase and, provided that the strengths of the magnetic fields and number of turns in the coils are substantially equal respectively, in magnitude.

A closed circuit is formed incorporating the coils 10, 11 as follows: coil 10, commutator bar 12, auxiliary brush 16, auxiliary lead 22, auxiliary brush 17, commutator bar 15, coil 11, commutator bar 14, auxiliary brush 18, auxiliary lead 23, auxiliary brush 19, commutator bar 13, coil 10.

The main brushes 20, 21, are electrically connected to one another and to an A. C. supply lead in a known manner.

It will be seen that the E. M. F.'s induced in coils 10, 11 are connected series aiding in the closed circuit, and provided that the contact resistance of the auxiliary brushes is a relatively small fraction of the contact resistance of the main brush and also that the resistance of the auxiliary lead is negligible, then only a fraction of the circulating current passes through the main brush, and this fraction can be arranged sufficiently small as not to interfere seriously with the commutation.

Whilst the drawing only illustrates diagrammatically the connections of two particular coils 10, 11 at the time when they are undergoing commutation it will be readily appreciated that similar connections will obtain for all coils undergoing commutation at main brushes 20, 21, and at all other main brushes.

In Figure 2 of the drawings is illustrated diagrammatically part of the connections of a three-phase A. C. commutator motor and frequency convertor embodying the present invention. Mounted on shaft 30 are the rotor 31 of the commutator motor and the rotor 32 of the frequency convertor. The rotor 31 rotates inside the stator 33 which carries primary windings 34, 35, 36 and secondary windings 37, 38, 39, each secondary winding corresponding to a primary winding. The rotor 32 rotates within the stator 40 which in its simplest form has no stator windings.

The rotor of the commutator motor carries commutator 41 to the segments of which are connected the ends of the coils of the motor rotor windings. The rotor of the frequency convertor is wound for the same number of poles as is the commutator motor and carries commutator 42 to which the ends of the coils of the frequency changer rotor windings are connected.

The primary stator and rotor windings of the commutator motor may be connected to a three-phase source of electric power in any of the known manners, either as a shunt motor, or as a series motor. For example, in the case of a shunt motor the primary stator winding may be connected to the supply directly and the rotor windings through the commutator and a transformer and/or regulator, in each case through suitable switchgear. In Figure 2 of the drawings one method of connecting a series motor has been shown by way of example. A three-phase supply is connected to the leads 55, and the rotor windings are connected through the commutator 41 and main brushes to the secondary windings of a transformer or regulator 43 the primary windings of which are connected in series between the supply and the primary stator windings.

It is preferable that the potential applied to the main brushes 57, 58, 59, of the frequency convertor should be substantially the same or directly proportional to the potential differences existing across the primary stator windings so that the E. M. F.'s induced in coils connected to adjacent commutator segments will be substantially the same as those induced in coils similarly placed electrically in the motor rotor. In the case of a shunt connected motor the full supply potential will exist across the primary stator windings of the motor and the main brushes of the frequency connector may be connected directly to the supply; however, in the case of a series connected motor such as that shown diagrammatically in Figure 2 the E. M. F.'s induced in the secondary stator windings 37, 38, 39 are substantially the same as or bear a definite ratio to the potential differences across the primary stator winding and it is these E. M. F.'s which are at supply frequency and induced in the secondary windings that are applied to the main brushes 57, 58, 59 of the frequency convertor.

Provided that the rotating field in the frequency convertor created by the supply frequency E. M. F.'s connected to the main brushes rotates in the same direction as the rotating field in the A. C. commutator motor, and provided that the rotor of the frequency convertor is wound for the same number of poles as the motor and is rotated at the same speed as the rotor of the motor, the frequency of the E. M. F.'s in the individual coils of the rotor of the frequency convertor will be the same as that induced in individual coils of the motor rotor by the rotating field in the motor. Provided that the strength of the two rotating fields and winding details are individually substantially the same or in the same ratio, the magnitude of the E. M. F.'s induced in the rotor coils of the motor and frequency convertor which are similarly placed electrically will be substantially the same in magnitude and phase.

Thus the ends of a coil undergoing commutation at, for example, main brush 56 are connected by means of auxiliary brushes 44, 45, 46, 47 and auxiliary leads 53, 54 to a coil that is substantially similarly placed electrically on the rotor 32 of the frequency convertor. The E. M. F.'s induced in the coils connected to segments 49, 50 and 51, 52 are series aiding in the closed circuit and hence little current circulates from commutator segment 49 to segment 50 through main brush 56 due to these E. M. F.'s.

Whilst the operation has been described only with reference to one main brush it will be understood that the same condition obtains at each main brush. Similarly, whilst only a two-pole construction has been shown diagrammatically in Figure 2 of the drawings it is to be understood that the invention is equally applicable to multipolar machines.

By supplying desired E. M. F.'s at slip frequency commutation in the A. C. commutator motor can be made better than in ordinary direct current motors.

By the invention the previous limitations on the design of this type of motor are removed, and this machine with its excellent characteristics can be used to better advantage than any other type, for economical speed variations over wide ranges can be effected. The machine can be designed with few poles, larger flux per pole, and can be made to operate sparklessly under any load and speed.

This invention may be applied to any type of polyphase commutator motor with either fixed or movable brushes.

I declare that what I claim is:

1. In combination with a polyphase A. C. commutator motor having a rotor, a plurality of rotor coils and a commutator connected to said rotor coils, means for deriving an E. M. F. of magnitude and phase comparable with that induced in each coil undergoing commutation and auxiliary commutator brush means and auxiliary leads for supplying each said E. M. F. to each said coil during commutation thereof in order to neutralise at least partially the effect of said induced E. M. F.

2. A motor as claimed in claim 1 in which the desired E. M. F. is derived from a suitable source external to said motor and is applied by means of said auxiliary brush means and said auxiliary leads series aiding in a closed circuit, formed by said source, said coil undergoing commutation, segments of said commutator, said auxiliary brush means and said auxiliary leads.

3. A motor as claimed in claim 2 in which the external source is a frequency convertor mounted on the shaft of said motor.

4. A motor as claimed in claim 3 in which one coil of the frequency convertor provides the desired E. M. F. of magnitude and phase comparable with that induced in each of said coils undergoing commutation.

5. A motor as claimed in claim 1 in which the desired E. M. F. is derived from a source internal of said motor and is applied by means of said auxiliary brush means and said auxiliary leads series aiding in a closed circuit formed by said source, said coil undergoing commutation, segments of said commutator, said auxiliary brush means and said auxiliary leads, said source being a coil of the motor rotor winding similarly placed with respect to another main brush.

6. A motor as claimed in claim 1 in which the desired E. M. F. is derived from a source internal of said motor and is applied by means of said auxiliary brush means and said auxiliary leads series aiding in a closed circuit formed by said source, said coil undergoing commutation, segments of said commutator, said auxiliary brush means and said auxiliary leads, said source being a rotor coil undergoing commutation at a main brush and displaced 360 electrical degrees with respect to a first coil undergoing commutation at a main brush, the ends of each rotor coil being connected to a leading and a trailing commutator segment, and in which the said auxiliary brush means and said auxiliary leads interconnect the leading and trailing commutator segments to which said coils undergoing commutation are connected.

7. A motor as claimed in claim 1 in which the desired E. M. F. is derived from a source internal of said motor and is applied by means of said auxiliary brush means and said auxiliary leads series aiding in a closed circuit formed by said source, said coil undergoing commutation, segments of said commutator, said auxiliary brush means and said auxiliary leads, said source being a rotor coil undergoing commutation at a main brush and displaced 360 electrical degrees with respect to a first coil undergoing commutation at a main brush, the ends of each rotor coil being connected to a leading and a trailing commutator segment, and in which said auxiliary brush means and said auxiliary leads connect each leading commutator segment to which is connected said first rotor coil undergoing commutation at a main brush, to a trailing commutator segment to which is connected a second rotor coil undergoing commutation at a main brush and displaced 360 electrical degrees from said first coil.

8. A motor as claimed in claim 1 in which the desired E. M. F. is derived from a source internal of said motor, said source being a second rotor coil undergoing commutation at a main brush and displaced 360 electrical degrees with respect to a first coil undergoing commutation at a main brush, the ends of each rotor coil being connected to a leading and a trailing commutator segment, and in which said auxiliary brush means and said auxiliary leads connect each leading commutator segment to which is connected a first rotor coil undergoing commutation at a main brush, to a trailing commutator segment to which is connected a second rotor coil undergoing commutation at a main brush and displaced 360 electrical degrees from said first coil.

9. A motor as claimed in claim 1 in which the desired E. M. F. is derived from a source external of said motor and is applied by means of said auxiliary brush means and said auxiliary leads, series aiding in a closed circuit formed by said source, said coil undergoing commutation, segments of said commutator, said auxiliary brush means and said auxiliary leads, said source being a rotor coil similarly situated electrically in a frequency convertor, the rotor of which is wound for the same number of poles and is rotated at the same speed as said motor, the ends of each motor rotor coil being connected to a leading and a trailing motor commutator segment, the coils of the frequency convertor rotor being connected to leading and trailing frequency convertor commutator segments, and in which said auxiliary brush means and said auxiliary leads interconnect leading and trailing commutator segments to which are connected respectively a coil on the motor rotor undergoing commutation at a main brush and a coil corresponding thereto electrically on the frequency convertor rotor.

10. A motor as claimed in claim 1 in which the desired E. M. F. is derived from a source external of said motor said source being a rotor coil similarly situated electrically in a frequency convertor, the rotor of which is wound for the same number of poles and is rotated at the same speed as said motor, the ends of each motor rotor coil being connected to a leading and a trailing motor commutator segment, the coils of the frequency convertor rotor being connected to leading and trailing frequency convertor commutator segments, and including auxiliary brush means for connecting each leading motor commutator segment to which is connected a motor rotor coil undergoing commutation at a main brush, to a trailing frequency convertor commutator segment to which is connected a frequency convertor rotor coil corresponding thereto electrically, and in which said auxiliary brush means and said auxiliary leads connect each corresponding trailing motor commutator segment to the corresponding leading frequency convertor commutator segment.

11. A motor as claimed in claim 1 in which the desired E. M. F. is derived from a source external of said motor said source being a rotor coil similarly situated electrically in a frequency convertor, the rotor of which is wound for the same number of poles and is rotated at the same speed as said motor, the ends of each motor rotor coil being connected to a leading and a trailing motor commutator segment, the coils of the frequency convertor rotor being connected to leading and trailing frequency convertor commutator segments, and including auxiliary brush means for connecting each leading motor commutator segment to which is connected a motor rotor coil undergoing commutation at a main brush, to a trailing frequency convertor commutator segment to which is connected a frequency convertor rotor coil corresponding thereto electrically, and in which said auxiliary brush means and said auxiliary leads connect each corresponding trailing motor commutator segment to the corresponding leading frequency convertor commutator segment, and means for applying to main brushes of the frequency convertor rotor E. M. F.'s corresponding to potential differences obtaining across primary stator windings of the motor.

12. In a polyphase A. C. commutator motor, a stator, a rotor, a commutator, a set of main brushes engaging segments of said commutator, windings on the stator, windings on the rotor comprising a plurality of ring connected coils the ends of which coils are connected to adjacent segments of the commutator, pairs of auxiliary brushes each pair comprising a leading and a trailing brush engaging adjacent commutator segments to which are connected the ends of a coil undergoing commutation at a main brush, means to interconnect each leading auxiliary brush engaging a commutator segment to which is connected a coil undergoing commutation at a main brush, to a trailing auxiliary brush engaging a commutator segment to which is connected a coil 360 electrical degrees away and undergoing commutation at a main brush, and means for connecting said main brushes and said stator windings to a polyphase electricity supply.

13. In combination, an A. C. commutator motor and a frequency convertor, including a motor stator, a motor rotor having a commutator, a frequency convertor stator, a frequency convertor rotor having a commutator, primary windings on said motor stator, a set of main brushes engaging said motor commutator, windings on said motor rotor comprising a plurality of ring connected coils, the ends of which coils are connected in sequence to adjacent segments of the motor commutator, windings on said frequency convertor rotor comprising a plurality of ring connected coils, the ends of which coils are connected in sequence to adjacent frequency convertor commutator segments, pairs of auxiliary brushes each pair comprising a leading and a trailing brush engaging adjacent segments of said motor commutator to which are connected the ends of a motor rotor coil undergoing commutation at a main brush, an equal number of pairs of auxiliary brushes each pair comprising a leading and a trailing brush engaging adjacent segments of said frequency convertor commutator, means to interconnect respectively trailing and leading auxiliary brushes engaging commutator segments of a motor rotor coil undergoing commutation, with leading and trailing auxiliary brushes engaging commutator segments to which are connected a frequency convertor rotor coil similarly electrically situated, secondary windings on said motor stator connected to main brushes of said frequency convertor commutator and means for connecting said motor stator primary windings and said motor main brushes to a polyphase source of electricity.

HERBERT VICKERS.

REFERENCES CITED

The following references are of record in the file of this patent:

UNITED STATES PATENTS

| Number | Name | Date |
| --- | --- | --- |
| 837,425 | Seyfert | Dec. 4, 1906 |
| 1,157,014 | Lippelt | Oct. 19, 1915 |
| 1,393,141 | Kostko | Oct. 11, 1921 |
| 2,112,506 | Schwarz | Mar. 29, 1938 |